(12) United States Patent
Hsu et al.

(10) Patent No.: US 6,282,613 B1
(45) Date of Patent: Aug. 28, 2001

(54) VERY EFFICIENT TECHNIQUE FOR DYNAMICALLY TRACKING LOCALITY OF A REFERENCE

(75) Inventors: Windsor Wee Sun Hsu, Sunnyvale; Honesty Cheng Young, Saratoga, both of CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/303,520

(22) Filed: Apr. 30, 1999

(51) Int. Cl.[7] .................................................. G06F 12/08
(52) U.S. Cl. ........................................... 711/118; 711/136
(58) Field of Search .................................... 711/136, 118

(56) References Cited

U.S. PATENT DOCUMENTS

| | | | |
|---|---|---|---|
| 5,375,623 | 12/1994 | Weber | 137/454.5 |
| 5,379,393 | 1/1995 | Yang | 711/3 |
| 5,452,440 | 9/1995 | Salsburg | 711/136 |
| 5,546,559 | 8/1996 | Kyushima et al. | 711/133 |
| 5,590,308 | 12/1996 | Shih | 711/136 |
| 5,608,890 | 3/1997 | Berger et al. | 711/113 |
| 5,627,994 | 5/1997 | Levy et al. | 711/150 |

OTHER PUBLICATIONS

P. J. Denning et al., "Properties of the Working–Set Model", *Communications of the ACM*, vol. 15, No. 3, Mar. 1972, pp. 191–198.

D.R Slutz et al., "A Note on the Calculation of Average Working Set Size", *Communications of the ACM*, vol. 17, No. 10, Oct. 1974, pp. 563–565.

*Primary Examiner*—Reginald G. Bragdon
(74) *Attorney, Agent, or Firm*—James C. Pintner; Heller Ehrman White & McAuliffe; Fleit, Kain, Gibbons, Gutman & Bongini P.L.

(57) ABSTRACT

A cache management system determines stack distance by determining the stack reuse distance, less the number of duplicate pages in the system trace. The stack reuse distance is defined as the number of references between the first reference to a datum and the next reference to the same datum. The stack reuse distance can be easily calculated by maintaining a count of data references in a stream. The system also recognizes that the number of duplicate pages in a cache can be approximated in a probabilistic manner, thereby improving the efficiency of the cache analysis. Stack distance can be approximated during normal system operation and stack analysis can be performed in a dynamic manner for optimal cache tuning in response to data reference workloads. Thus, the cache miss ratio curve is generated either from a system trace in an off-line mode, or in real time during normal system operation.

31 Claims, 8 Drawing Sheets

VERY EFFICIENT TECHNIQUE FOR DYNAMICALLY TRACKING LOCALITY OF A REFERENCE

BACKGROUND OF THE INVENTION

1. Field of the Invention

This invention relates generally to network computer systems and, more particularly, to efficient transfer of data from client computers to server computers.

2. Description of the Related Art

Computer systems can perform no faster than the speed with which they are supplied data. Most computer networks include many server computers and client computers that exchange data with each other across network links. The clients and servers may share memory and data storage. For example, many computer systems have a hierarchical memory store with primary storage that may include disk libraries and RAID (Redundant Arrays of Inexpensive Disks) implementations. Because disk libraries and RAID systems are slow compared to storage such as dynamic random access memory (DRAM), data that are believed likely to be used more often are temporarily placed into faster memory, called cache memory. Much of the opportunity for improving the performance of such computer systems lies with efficient control of the memory hierarchy.

Efficiency of a memory hierarchy, such as a cache, is characterized by the cache miss ratio, which is the percentage of time that a data reference is requested and not found in the cache. Generally, a larger cache reduces the cache miss ratio and improves system performance, because a cache miss necessitates retrieval of the data from slower and cheaper data store, such as disk memory, and therefore slows down system data operations as processes wait for the data. Cache is typically constructed with semiconductor memory and can be costly, so cache is usually limited in size and designed to a targeted miss ratio. The system management task is to determine the most efficient cache size for the available resources and the tolerable miss ratio. In addition, cache may be partitioned, and further data store tuning may be achieved by the allocation of cache partitions to workload streams. The system management task becomes a workload balancing problem that is addressed by cache sizing and cache allocation.

Given a fixed workload stream of data references, the cache miss ratio can be plotted as a function of cache size. The cache miss ratio curve thus plotted can indicate when increasing cache size reaches the point of diminishing returns, and therefore the cache miss ratio curve can be used to make decisions about cache size and cache allocation to workload. Experimentally determining the cache miss ratio curve would necessitate preparing a workload and operating a variety of cache sizes with the workload, all the while keeping statistics on the miss ratio being experienced. This can be very difficult and time consuming, because the range of cache sizes can be vast. For example, cache size can easily vary from 10 megabytes (MB) of data to 10 gigabytes (GB) of data.

It is possible to determine the cache miss ratio for a cache of a given size and given workload through an off-line simulation of cache operation. The simulation is achieved by using a predetermined workload to generate a system trace, which is a historical record of every data reference requested in a computer system. The system trace, for example, may be the result of a workload comprising all data pages (blocks of 4K bytes of data) referenced over a time period of interest. The actual system outcome of each data reference is not important for the simulation, as the size of the cache being simulated will determine whether there is a hit or miss. The simulation program receives the trace, processes each request in the trace, and determines whether each data reference in the trace would have resulted in a cache hit or miss, in accordance with the size of the simulated cache. The system traces used in such simulations can be industry-standard bench marks, such as the well-known trace benchmarks referred to as "TPC-C" and "TPC-D".

Thus, with the system trace and off-line simulation, a cache miss ratio curve can be derived without constructing and operating a range of cache sizes. Unfortunately, the system trace can be a rather large file and the simulation can take a long time to perform. To ensure valid simulation results, the trace is typically at least ten times the size of the largest cache being simulated. Therefore, techniques for simulating the operation of cache and deriving the cache miss ratio curve have been developed. One way of deriving the cache miss ratio is to simulate cache operations as a column of references, or stack. Such techniques are referred to as stack algorithms. One such cache analysis technique involves a cache organized as a Least Recently Used (LRU) cache, in which data references are kept in a stack, with new data references placed at the top of the stack and older data references pushed down the stack. Each data reference will be associated with a stack distance, which represents the distance from the stack top where a cache entry is located. For each data reference in a system trace, the stack distance determines whether there is a cache hit or a cache miss.

Figure 1:
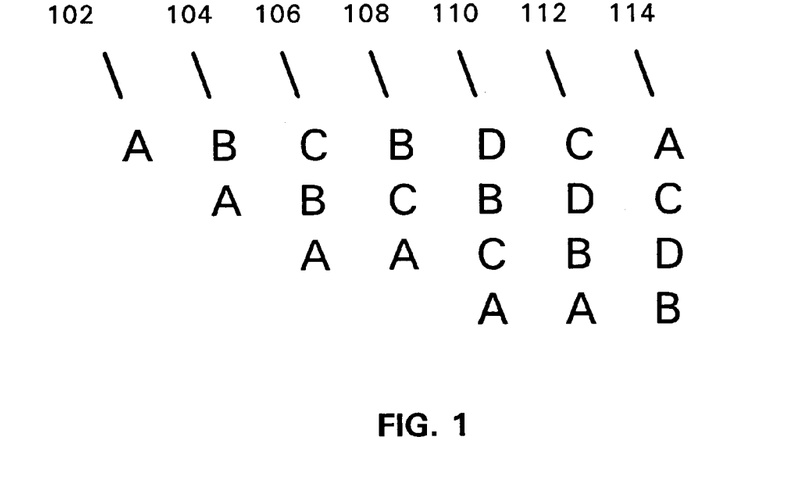
FIG. 1 is a stack representation of a cache that illustrates a sequence of data references, producing cache hits and misses.

Any cache can be represented as a data stack, and a system trace can be applied to determine cache hits and misses for the particular size cache. For example, FIG. 1 is a stack representation of cache operation that shows multiple columns that correspond to a sequence of data references in a system trace for an LRU stack. Proceeding from left to right for an initially empty stack, the left-most column of FIG. 1 indicates that the first data reference is a request for datum "A", which can be, for example, a request for a particular 4K data block, or page. Because A is not initially in the stack, the request for A is a cache miss. Thus, A would be entered into the cache and therefore is placed at the top of the stack, at cache location "1". Moving to the next column 104, the next data reference is a request for "B", which also is not initially in the cache and results in a cache miss. Therefore, B would be entered into the cache, and so A is pushed down in the stack to stack location "2" and B is placed at the top. Similarly, the third column 106 of FIG. 1 indicates that the next data reference is to "C", which is another cache miss, so that C would be entered into the cache and therefore is placed at the top of the stack.

Those skilled in the art will recognize that the fourth column 108 of FIG. 1 indicates that the next data reference is to the B page, which already is in the cache. In this LRU stack, the "stack distance" for B upon receiving this data reference is said to be two, because in the previous column 106 B is in the second stack position, one down from the top. In an actual cache operation, the reference to data page B would result in the cache being searched for B to resolve whether B is in the cache or not. This is referred to as a reference interval for resolution of the B page reference. Simulating the cache as a stack, the reference to B results in the B page moving to the top of the stack, pushing down C at the current stack interval 108. It should be apparent that if a cache has at least two page memory locations, then B will be in the cache at 106 and the data reference to B at that time will result in a cache hit at 108. The next column 110 of FIG. 1 indicates a reference to "D", which is not in the cache. This results in a cache miss and placement of D at the top of the stack.

The sixth column 112 indicates the occurrence of another data reference to C, which is in the cache, and therefore C is moved to the top of the stack. In the previous column 110, C had a stack distance of three. Therefore, upon receiving the request for C at 110, a cache hit will occur in a cache being simulated if the cache has at least three page memory locations, and will result in a cache miss otherwise. Finally, the seventh column 114 of FIG. 1 indicates another reference to A, which goes to the top of the stack. In the prior column 112, the stack distance for A was four. Accordingly, it should be apparent that a cache size of four data pages or greater will result in a cache hit for the data reference to A at 112, and that otherwise there will be a cache miss.

Thus, to determine the cache miss ratio curve, it is necessary to determine the cache distance for a data reference and determine if there was a hit or miss, and it will be necessary to search through the entire stack to find the location of a reference in the stack. The amount of searching required by this aspect of the simulation can consume a great amount of system resources. Recently, efforts to improve the derivation of the cache miss ratio curve have involved stack analysis techniques.

For example, U.S. Pat. No. 5,627,994 describes a method for allocating request streams and memory resources to a cache architecture, and derives a stack distance distribution through stack analysis. Such techniques for stack analysis can be used to address the cache sizing problem and improve system performance.

Cache storage system vendors and memory management program vendors have provided a multitude of opportunities to tune cache parameters. An optimal technique would be to permit dynamic self-tuning of cache parameters, to automatically determine the effect of cache partitions and reference stream allocations. It should be apparent that deriving the cache miss ratio curve for a variety of operating parameters is necessary to make informed tuning of cache parameters, whether such tuning is performed manually or automatically. It also should be apparent that dynamic self-tuning techniques must derive the cache miss ratio curve very efficiently to avoid slowing down the system operation.

From the discussion above, it should be apparent that there is a need for a stack analysis technique that can efficiently derive the cache miss ratio for a broad range of cache sizes. The present invention fulfills this need.

SUMMARY OF THE INVENTION

The present invention defines a stack reuse distance and recognizes that the stack distance can be approximated by determining the stack reuse distance, less the number of repeated page references among the recently used pages. In accordance with the invention, the stack reuse distance is defined as the number of references between the first reference to a datum and the next reference to the same datum, so that stack reuse distance can be easily calculated by maintaining a count of data references in a stream. Moreover, the present invention recognizes that the number of repeated page references between two references to the same page in a cache can be approximated in a probabilistic manner, thereby improving the efficiency of the cache analysis. This permits an efficient derivation of stack distance, such that stack distance can be approximated during normal system operation and stack analysis can be performed in a dynamic manner for optimal cache tuning in response to data reference workloads. Thus, the cache miss ratio curve is generated either from a system trace in an off-line mode, or in real time during normal system operation. In this way, a variety of cache operating parameters can be tuned in either a static or dynamic environment.

In one aspect of the invention, the reuse distance is tallied for each reference in a data stream to generate a reuse distribution, which is a property of the stream. Both the reuse distance and the reuse distribution are easily generated by accumulating data as the cache storage system operates. In another aspect of the invention, the number of duplicate pages is approximated by a cumulative probability that the reuse distance is less than the distance between each pair of references in the data stream. This permits the stack analysis to be performed with sufficient efficiency that the data stream need not be an off-line system trace, but can be on ongoing stream of data references, thereby readily permitting dynamic tuning of cache parameters.

Other features and advantages of the present invention should be apparent from the following description of the preferred embodiment, which illustrates, by way of example, the principles of the invention.

DESCRIPTION OF THE PREFERRED EMBODIMENT

The present invention recognizes that the primary difficulty in determining the stack distance for a given reference is to account for the number of other pages referenced during the reference interval for the current page. The invention further recognizes that, examining the stream of data references (or page requests), it is necessary to account for any repeated references to other pages between two references to the same page. In accordance with the invention, a reference "reuse distance" is defined and used to approximate the stack distance, from which the cache miss ratio curve can be constructed. In particular, the reuse distance of a data reference to a current page is defined to be the number references to other pages since the last reference to the current page. In the preferred embodiment, the stack distance is approximated from the cumulative distribution of the reuse distance. The accumulation of reuse distances can be performed with relative efficiency, both in terms of system processing resources and data store costs. In this way, the cache miss ratio for a cache memory system can be determined for a wide range of cache sizes. The efficiency of the technique is such that dynamic tuning of cache operating parameters can be carried out.

Stack Representation

As noted above, a cache can be represented as a stack that is ordered according to a priority function. In the preferred embodiment, the stack is organized as a Least Recently Used (LRU) stack, with the most recently referenced (or requested) data block or page on top. The stack level at which a reference is located is referred to as its stack distance, and represents the minimum cache size for which the page is resident. Other stack ordering techniques include Least Frequently Used (LFU), and other techniques will be known to those skilled in the art. Most common is the LRU, which will be assumed herein unless indicated otherwise. Those skilled in the art will recognize that the cache miss ratio can be computed by accumulating the frequency distribution of the stack distance. More particularly, the accumulated stack frequency distribution, called the stack distribution, for a cache of size C and a stream of data references, is given by Equation (1) below:

$$MissRatio(C) = 1 - \sum_{i=1}^{C} hits(i)/N \tag{1}$$

where hits(i) is the stack distribution and N is the total number of references in the stream of data references.

Figure 2:
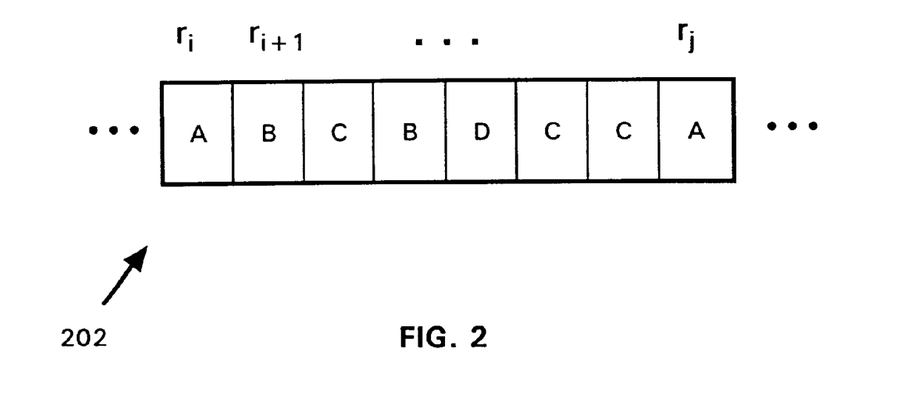
FIG. 2 is a stack representation of a stream of references in a cache that illustrates cache reuse distance as defined in accordance with the present invention.

FIG. 2 illustrates the reuse distance of a reference as defined in accordance with the present invention. The adjacent boxes of FIG. 2 represent a stream of data references $r_1, r_2, \ldots r_i, r_{i+1}, \ldots r_j$, which are requests for particular pages of data, from the earliest reference at $r_i$ to the latest reference at $r_j$. In accordance with the invention, the stack distance function for a data reference R is given by the reuse distance to R minus the number of duplicated or repeated references since the last reference to R, as represented by Equation (2) below:

$$\text{Stack Distance}_R(x) = \text{Reuse Distance}_R(x) - \text{Repeated Pages}_R(x), \tag{2}$$

where x indicates a particular data reference in a stream. Thus, in FIG. 2 for the reference to A at $r_j$, the reuse distance is the distance (the number of pages) from the first A reference to the last A reference at $r_j$, which is equal to 7. It can be seen that the number of duplicated or repeated references includes B. (once) and C (twice), equal to 3. Therefore, the stack distance in FIG. 2 is 7−3=4. It should be noted that the reference stream illustrated in FIG. 2 as given by Equation (2) results in the stack representation of FIG. 1.

It has been found that the number of duplicate pages since the last reference is generally determined by the reuse distribution, which is the cumulative distribution of reuse distances. It also has been found that the stack distance can be estimated from the reuse distribution by carefully accounting for the duplicate pages. Therefore, for a stream of data references given by $r_i, r_{i+1}, \ldots$, with corresponding data pages given by $p_i, p_{i+1}, \ldots$, and for a particular current data reference j, then the reuse distances given by $distance_{reuse}(j)$ and the stack distances given by $distance_{stack}(j)$, and for $p_i = p_j$ and $p_i = p_k$ and for $[i<k<j]$, the $distance_{reuse}$ and $distance_{stack}$ are given by Equation (3) and Equation (4), respectively, below:

$$distance_{reuse}(j) = j - i \tag{3}$$

$$distance_{stack}(j) = distance_{reuse}(j) - Dup(i+1, j-1) \tag{4}$$

where Dup(x,y) denotes the number of duplicate pages in the stream of referenced pages $p_x, p_{x+1}, \ldots, p_y$. In accordance with the invention, an indexing function X is defined next, where X is given by Equation (5) below:

$$X_k = \begin{cases} 1 & \text{if } p_k \in \{p_{i+1}, \ldots, p_{k-1}\} \\ 0 & \text{otherwise} \end{cases} \tag{5}$$

Then it can be seen that Dup(x, y) is given by Equation (6) below:

$$Dup(i+1, j-1) = \sum_{k=i+1}^{j-1} X_k \tag{6}$$

And then the expected value E of the duplicate page function can be derived as noted below in Equation (7), Equation (8), and Equation (9) below:

$$E[Dup(i+1, j-1)] = \sum_{k=i+1}^{j-1} X_k \tag{7}$$

$$= \sum_{k=i+1}^{\square} P(X_k = 1) \tag{8}$$

$$\approx \sum_{k=0}^{j-i-1} F_{reuse}(k) \tag{9}$$

where $F_{reuse}(k)$ denotes the cumulative frequency distribution of the reuse distance. As a result, in accordance with the invention, the stack distance can be approximated by the relationship given by Equation (10) below:

$$distance_{stack}(j) \approx distance_{reuse}(j) - \sum_{k=0}^{j-i-1} F_{reuse}(k) \tag{10}$$

which provides the stack distance for a particular reference j.

Thus, the stack distance for a reference can be estimated from the reuse distance and from the probability distribution of the reuse distance. Such an estimation requires many operations to be performed. The actual number of operations may be on the order of the number of pages in the cache size of interest. If this estimate is performed on every reference, it can be more costly of system resources than desired. A system constructed in accordance with the present invention avoids estimating the stack distance for every reference, which requires calculating the reuse distance for every reference. Rather, the invention contemplates accumulating the distribution of reuse distance and periodically estimating the stack distance distribution. If the cumulative probability distribution of the stack distance is represented by $F_{stack}(k)$, then the stack distribution can be approximated by the expected value of the duplicate page function, as given below in Equation (11):

$$F_{stack}\left(x - \sum_{k=0}^{x-i} F_{reuse}(k)\right) \approx F_{reuse}(x) \quad (11)$$

This technique permits more rapid derivation of the cache miss ratio, as a result of which the cache management tasks are simplified. Exemplary processing to carry out processing in making the computation is given in further detail below.

Those skilled in the art will appreciate that the simplified technique for determining stack distribution and, ultimately, cache miss ratio, will permit easier cache tuning in off-line analysis and also in dynamic tuning schemes. Therefore, a cache storage system having a cache controller constructed in accordance with the present invention produces more efficient operation and utilization of system resources.

Cache Management System Block Diagram

Figure 3:
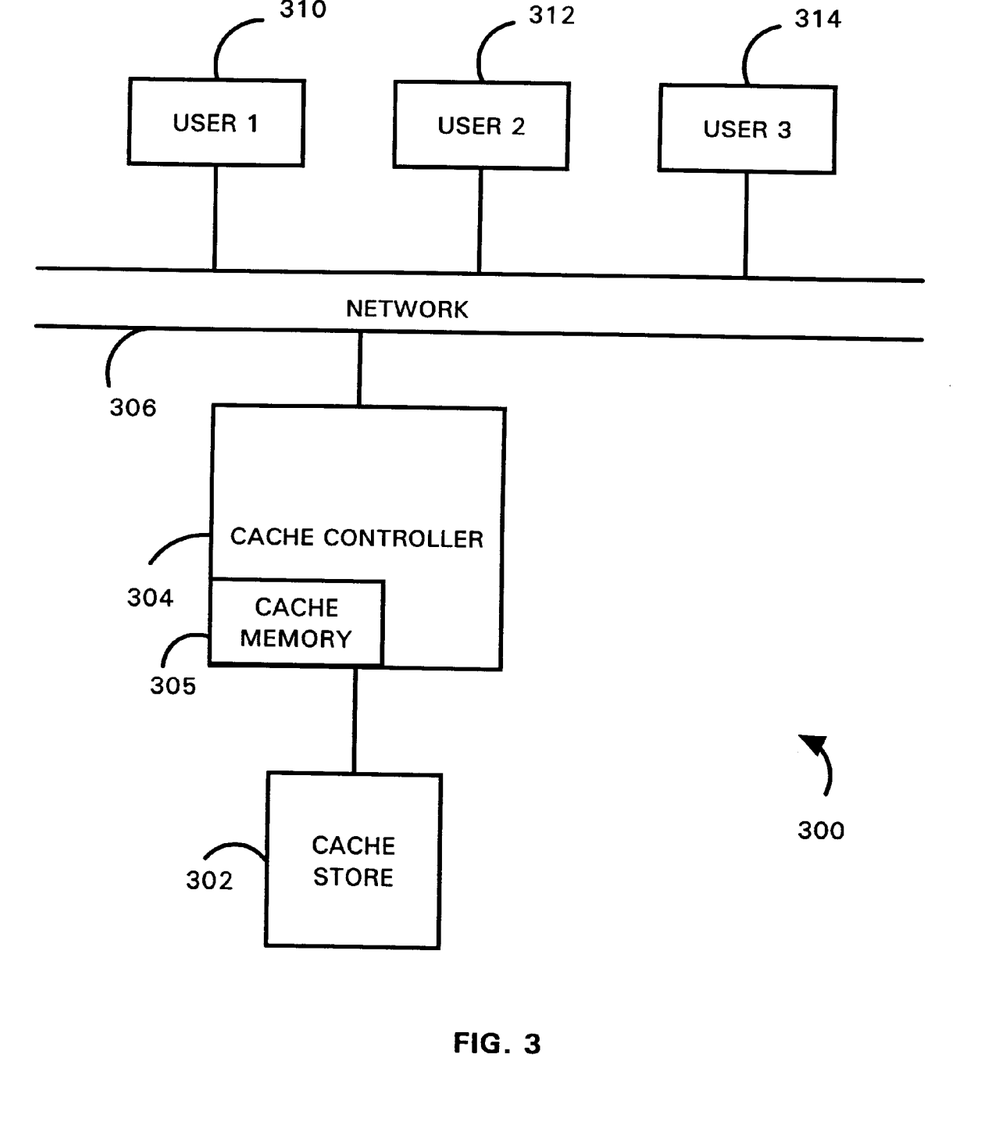
FIG. 3 is a block diagram of a cache management system constructed in accordance with the present invention.

FIG. 3 is a block diagram of a cache management system 300 constructed in accordance with the present invention. Cache store 302 in the form of dynamic random access memory (DRAM), is operated under control of a cache controller 304. The cache controller includes cache memory 305. The cache controller communicates with a network 306 and with other computers 310, 312, 314 that also are connected to the network. Data references comprising requests for data are sent from the computers 310, 312, 314 over the network 306 to the cache controller 304. Each request is for a predetermined block of data, such as a 4 KB page. The cache controller determines if the requested data is resident in the cache 302. If the page is in the cache, a condition called a cache hit, then the cache controller responds with an acknowledgment and processing of the data continues. If the page is not in the cache, called a cache miss, then the cache controller requests the data from another data store on the network, perhaps from one of the computers 310, 312, 314, loads the data into the cache 302, and then continues with processing of the requested data.

Figure 4:
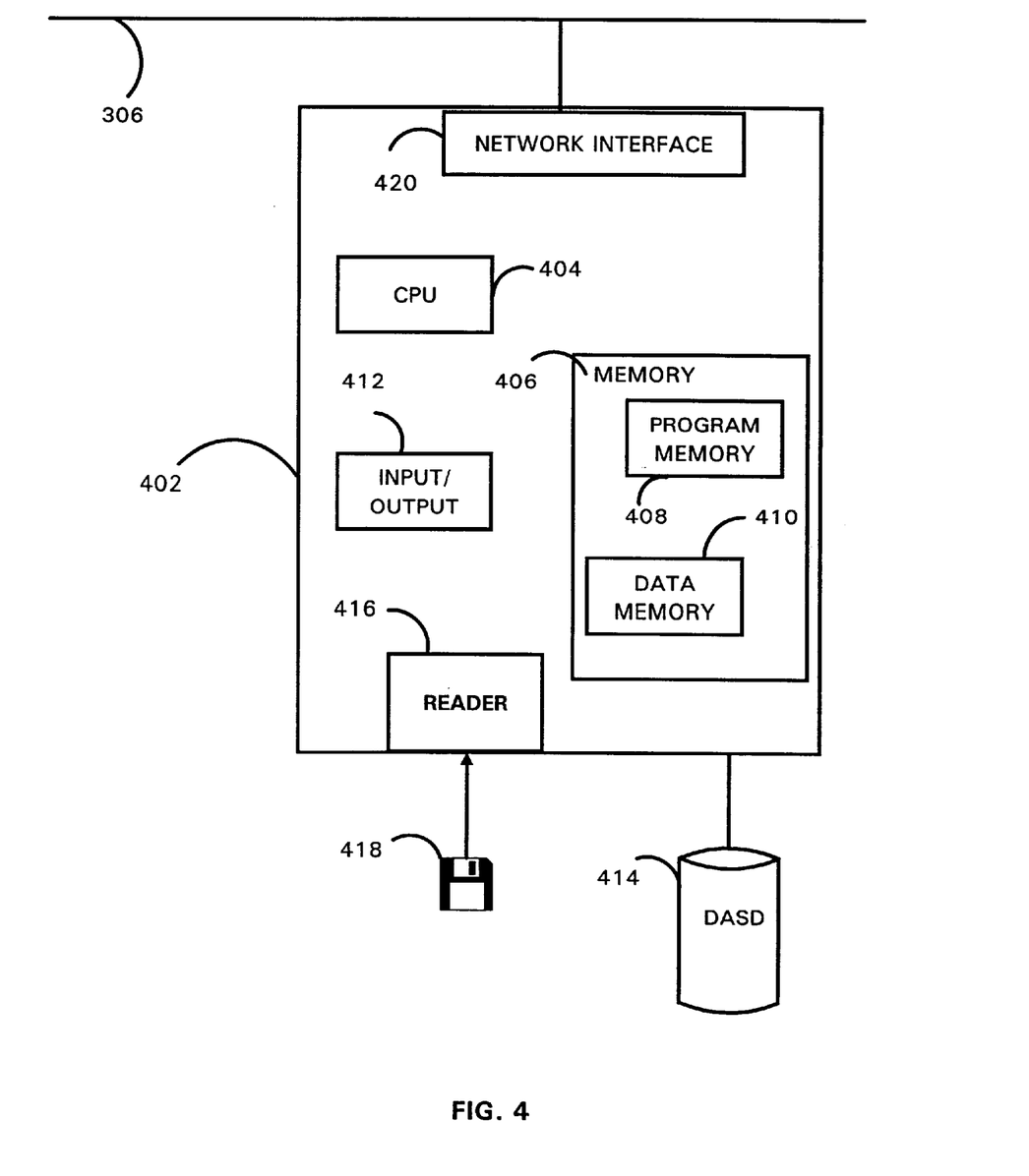
FIG. 4 is a detailed block diagram of the cache controller computer illustrated in FIG. 3.

FIG. 4 is a computer block diagram 402 of the cache controller 304 illustrated in FIG. 3. It should be understood that the other computers 310, 312, 314 of the computer system illustrated in FIG. 3 have a construction similar to that shown in FIG. 4, so that details described with respect to the FIG. 4 computer 402 will be understood to apply to all computers of the system 300. Alternatively, any of the computers 304, 310, 312, 314 can have a variety of construction, so long as they can communicate with the other computers and can transfer data blocks between them.

Each computer 402 includes a central processing unit (CPU) 404, a main memory 406 comprising a program memory 408 and a data memory 410, input/output devices 412 such as a keyboard and display, and a direct access storage device (DASD) 414, such as a hard disk drive. The main memory 406 typically comprises volatile semiconductor random access memory (RAM). The DASD 414 is typically used to store instructions that when executed implement the operating system of the computer 402. The operating system can be any one of a wide variety of systems, such as "Windows 98" by Microsoft Corporation, or "Macintosh" by Apple Computer Corporation, or the like.

Each computer 402 preferably includes a program product reader 416 that accepts a program product storage device 418, from which the program product reader can read data (and to which it can optionally write data). The program product reader 416 can comprise, for example, a disk drive, and the program product 418 can comprise removable media such as a magnetic floppy disk, a CD-R magneto-optical disk, or a CD-RW disk. Each computer 402 of the system communicates with the others via the network 306 through a network interface 420, and thereby comprises a network node.

Each computer 402 performs its functions by executing instructions stored in the program store 408 of the main memory 406. When the program instructions are executed, the computer performs its functions, which in the case of the cache controller, 304 are cache management functions. The instructions can be received from the DASD 414, through the program product storage reader 416, or through the network interface 420. The storage reader 416 can receive a program product storage device 418, read program steps recorded on the program product storage device, and transfer the program steps into the main memory 406. As noted above, the program product storage device can comprise any one of multiple removable media having computer-readable instructions, including floppy disks and CD storage. Other suitable program product storage devices can include magnetic tape and semiconductor memory. In this way, the processing steps necessary for operation in accordance with the invention can be embodied on a program product. Alternatively, the program steps can be received into the operating memory 410 over the network 306. In the latter method, the computer receives data into the main memory 408 through the network interface 420 after network communication has been established by well-known methods that will be understood by those skilled in the art without further explanation.

Deriving Cache Miss Ratio from Stack Distance

Figure 5:
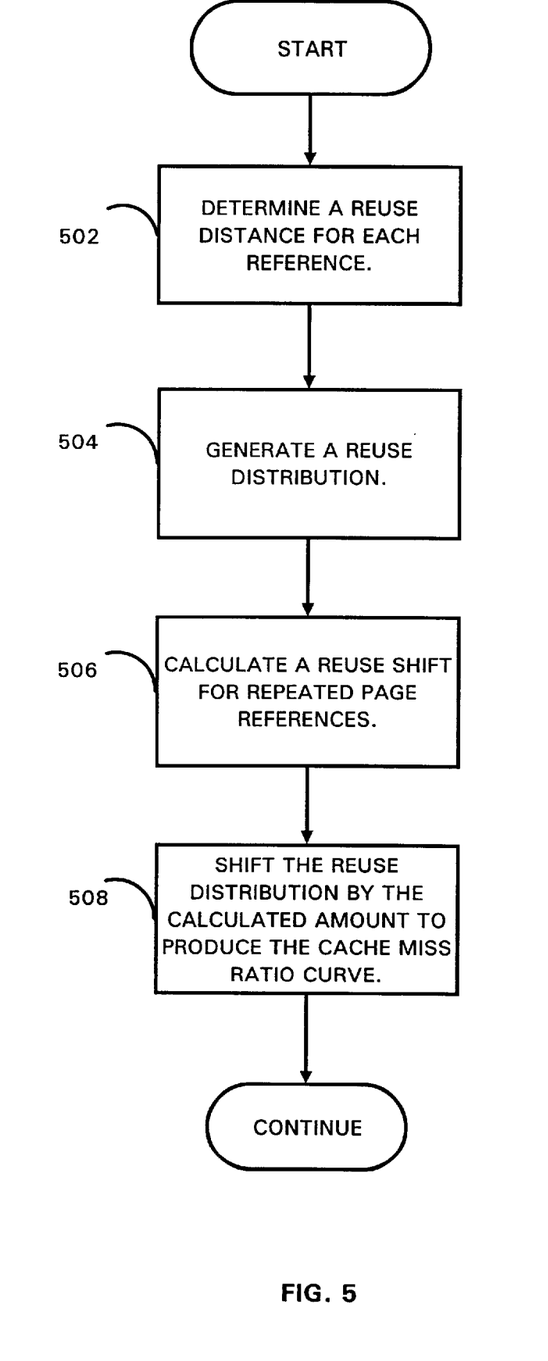
FIG. 5 is a flow diagram that illustrates the processing steps executed by the computer processing system of FIG. 3 to implement the derivation of a cache miss ratio curve in accordance with the present invention.

FIG. 5 is a flow diagram that illustrates the processing steps executed by the computer processing system of FIG. 3 to implement the derivation of a cache miss ratio curve in accordance with the present invention. That is, a cache controller or other computer constructed in accordance with the invention performs the processing steps illustrated in FIG. 5 to determine the cache miss ratio without determining the cache distance for each reference.

In the first processing step, represented by the flow diagram box numbered 502, the computer determines a reuse distance. As noted above, the invention defines "reuse distance" as the number of references that occur between any two references to the same page. In accordance with the invention, the processing for box 502 involves determining, for each reference in a stream, the number of intervening page references. For example, in FIG. 2, the reuse distance upon receiving the second reference to A at $r_j$ is seven pages. The reuse distribution is generated by accumulating a tally for each reuse distance. In the FIG. 2 example, when processing the second reference to A, the tally count for distance$_{reuse}$=7 will be incremented by one. After all the references in the stream have been processed, the distribution of tally counts for all the distance$_{reuse}$ values will provide the reuse distribution, as indicated by the flow diagram box numbered 504. The processing to obtain the reuse distribution is described in greater detail below.

It should be apparent that the reuse distance can be easily determined upon processing each new incoming (current) reference by maintaining a reuse count for every processed data reference in cache and incrementing the reuse count when a new reference is received. The reuse count when a page received in a new reference is already in cache will be the reuse distance for that reference. Those skilled in the art will appreciate that some systems automatically keep such a count for purposes of improving page replacement policy. In such systems, the amount of programming necessary to implement this aspect of the present invention is minimized. Thus, the reuse distance distribution generated by the box 504 processing will have reuse distances plotted along the horizontal (x) axis and will have frequency plotted along the vertical (y) axis.

The next processing step to generate the cache miss ratio is represented by the flow diagram box numbered 506, which indicates that a reuse shift is calculated to account for repeated page references. As noted above, stack distance is defined as the reuse distance minus the number of repeated pages. The first processing step 502 provides the reuse distance, and this step 506 provides the number of repeated pages. This value can be easily determined from the reuse distribution using Equation (9) above. Such processing may be implemented with cache directory processing by the cache controller. The reuse shift will horizontally move the reuse distribution curve.

Rather than add to a tally for each reference to determine the number of duplicate pages, the invention contemplates deriving the duplicate page count in a probabilistic manner. This derivation has been found to provide a reasonable approximation to the actual statistic, with greater efficiency. This approximation is provided by the mathematical relationship specified by Equation (11) above. Thus, the processing for box 506 can comprise the calculation of Equation (11) rather than the processing described above, maintaining a count, reference by reference. The approximation is a more efficient means of obtaining the duplicate page information necessary to derive the cache miss ratio.

After the duplicate page count processing, the next step 508 is to shift the reuse distribution curve by subtracting the calculated reuse shift found by the previous step 506. The shifting step involves, for each cache size for which reuse distribution processing was performed, determining a corresponding reuse shift amount. After the reuse shift is determined and subtracted, the next step of processing is to produce the adjusted reuse distribution curve as the cache miss ratio curve, as indicated by the flow diagram box numbered 508.

Figure 6:
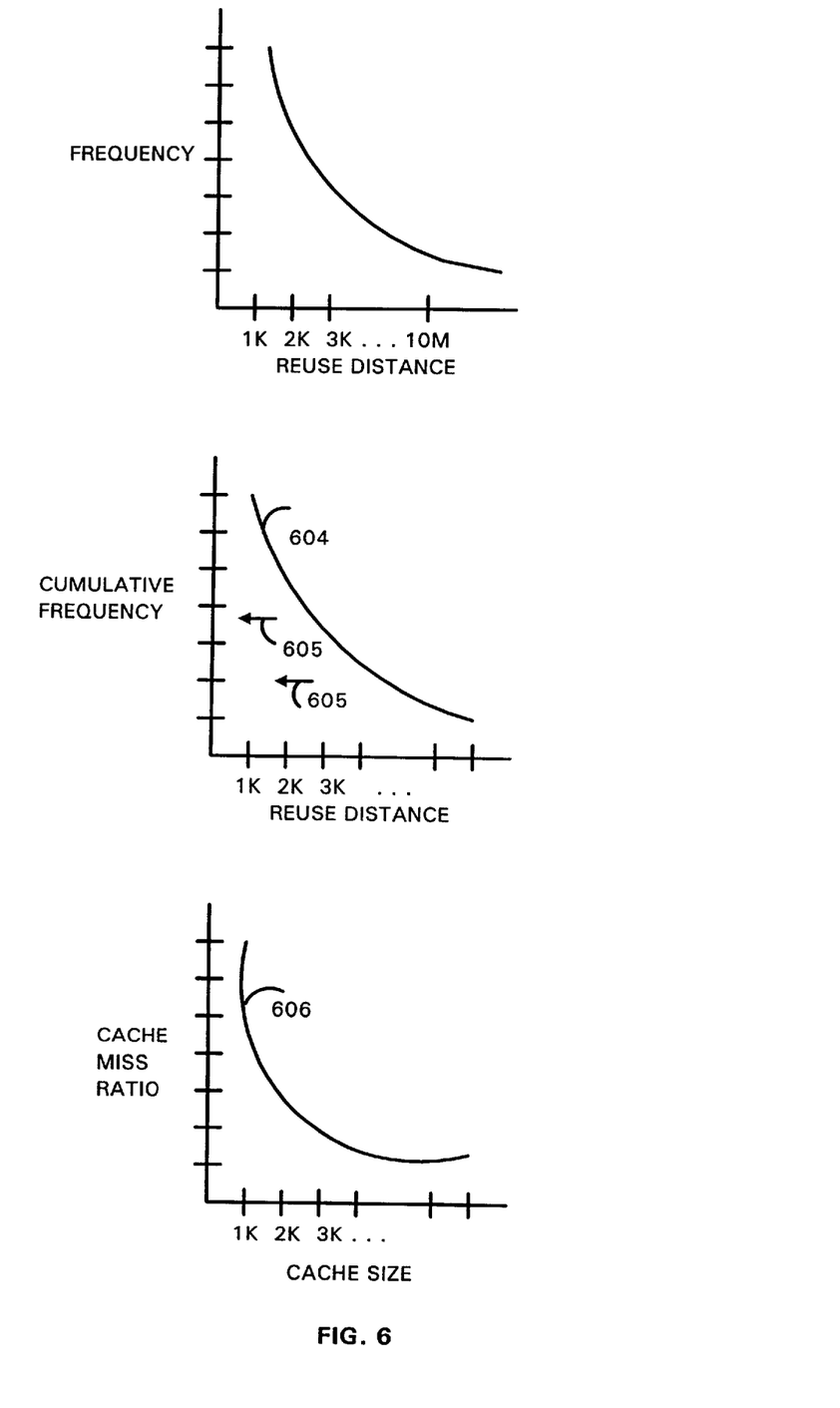
FIG. 6 is a representation of the data processing carried out by the program steps of FIG. 5.

FIG. 6 is a graphical representation of the processing carried out by the steps illustrated in the FIG. 5 flow diagram. The first curve 602 of FIG. 6 shows the cumulative reuse distribution that might be derived from processing a reference stream. This curve is produced by the processing of FIG. 5 box 502. It should be understood that the reference stream comprises a stream of data references, and that such references can be either off-line data such as from a system trace, or can be a stream of real-time references that occur during system operation. The second curve 604 of FIG. 6 shows the cumulative distribution that is calculated from the count of duplicate pages for each reference in the data stream. This curve represents the processing of FIG. 5 box 504. The arrowheads of the curve 604 indicate a negative shift in the reuse distribution that will take place. It should be understood that a negative shift will occur for each cache size being analyzed. That is, there will be a duplicate page shift calculation at the level of granularity of the cache size analysis. The last curve 606 of FIG. 6 shows the resulting cache miss ratio curve that is calculated after the duplicate page shift has been applied, implementing the negative shift in the reuse distribution. This curve corresponds to the processing in box 508 of FIG. 5.

Thus, the cache miss ratio is obtained without determining the stack distance for each reference in a stream. This improves the efficiency of processing and running a simulation of cache operations. In this way, it is easier to adjust cache parameters for optimal processing.

GENERATING A REUSE DISTRIBUTION

Figure 7:
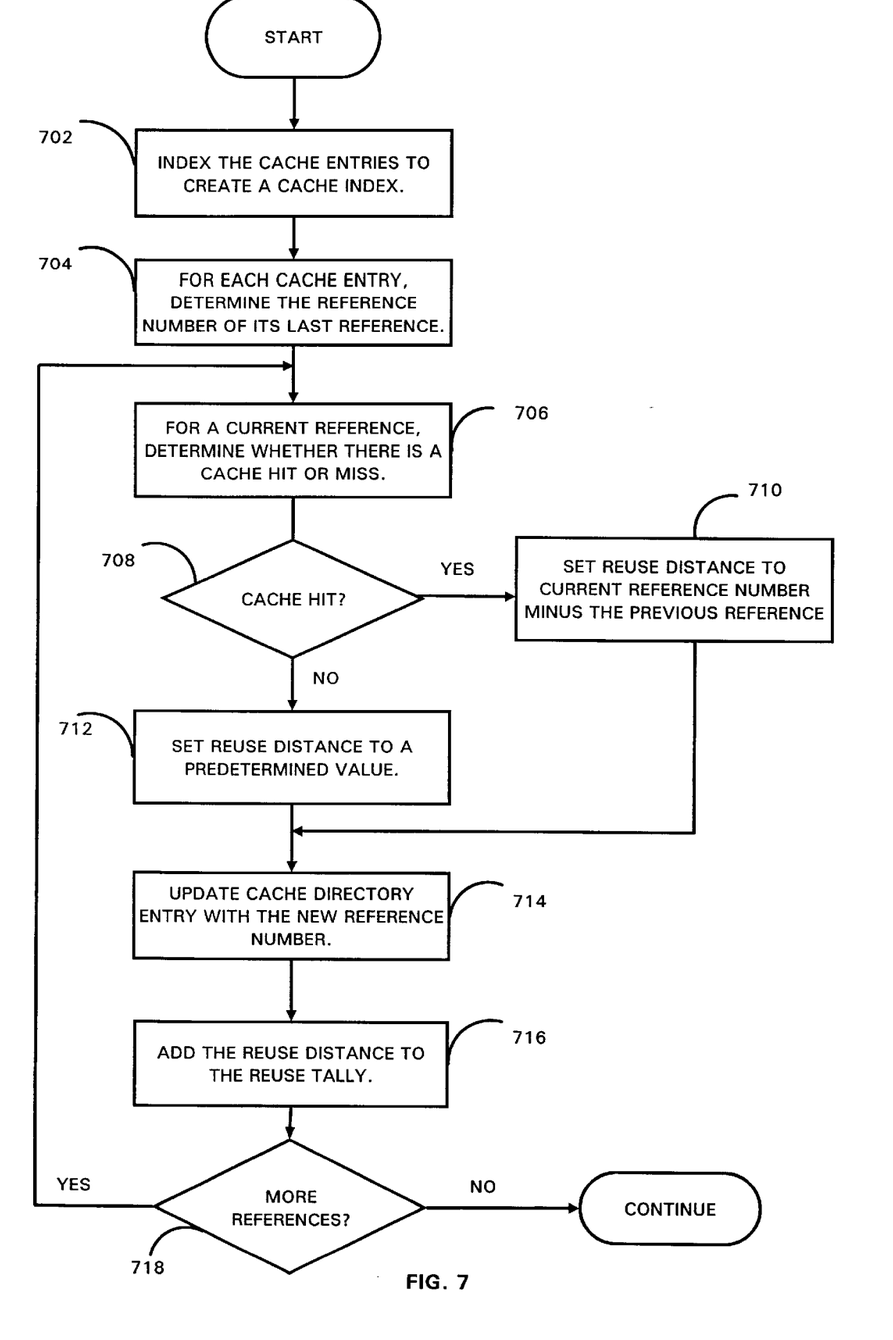
FIG. 7 is a flow diagram that illustrates the processing steps executed by the computer processing system of FIG. 3 in generating a reuse distribution.

FIG. 7 is a flow diagram that illustrates the processing steps executed by the computer processing system of FIG. 3 in generating a reuse distribution. This is the initial distribution that will serve as the basis for determining the cache miss ratio.

In the first processing step, represented by the flow diagram box numbered 702, the computer processing system indexes the cache entries to create a cache index. Each entry in the cache will have an associated index, or location in the cache. For an LRU cache constructed in accordance with the invention, a hash table is used to implement the cache directory, as known to those skilled in the art. In particular, each entry in the hash table contains a pointer to a linked list, so there is a linked list entry corresponding to each page in the cache. The linked list is ordered according to the time a page is last referenced. When a new reference is received, its page address is hashed to find the page address in the hash table. If the page is in the hash table, the pointer is followed to the linked list entry. The entry is then moved to the beginning (top) of the list. If the page is not found in the cache, and the cache is full, then a page is selected for replacement by examining the last entry in the linked list. In this way, an LRU cache uses a constant number of operations to service a reference. Thus, the cache miss ratio for one size of cache is determined. To obtain a cache miss ratio curve for a range of sizes, the stack distance must be determined for every reference, which can be very expensive.

Next, for each cache entry or index location, the processing system determines the reference number of the last reference. This processing is represented by the flow diagram box numbered 704. The system maintains a reference number that associates a sequential number or operating interval with the occurrence of each reference in the data stream. Each time a page is referenced, the system increments the reference number count, and associates the reference number count with the page that was referenced.

The system next processes each new reference, or data request, in turn. It should be understood that the stream of references being processed can be either system trace data that is analyzed in an off-line mode, or can be a stream of actual references in real time, as they are received by the system. That is, the present invention permits real-time derivation of cache miss ratio and thereby permits dynamic tuning of cache operating parameters, including cache size and workstream allocation. To process each new current reference, represented by the Figure 7 flow diagram box numbered 706, the system determines whether the requested data block is in the cache (a cache hit) or if the data block is not found (a cache miss). This processing may be implemented with a hash table, as described above for box 702.

The cache hit/miss decision making is represented by the FIG. 7 decision box numbered 708. If the reference was found in the cache, then there was a cache hit, an affirmative outcome at the decision box, and at the box numbered 710 the system will set the reuse distance for the current reference to the current reference number minus the previous reference number. This is equivalent to the outcome that is provided by the processing of Equation (3) described above.

It should be noted that the processing of box 710, setting the reuse distance, involves keeping a reference count and associating the count with each data block, or page, that is referenced. Each time any data page is referenced, the reference count is incremented to provide a unique identifying number. The associated reference numbers and page numbers can be kept in a directory or table that keeps track of the last time a page was referenced. Determining the reuse distance is then a simple subtraction of the old count from the new count. For example, FIG. 2 shows a stream of references A, B, C, B, D, C, C, A. For a corresponding reference count of 1, 2, 3, . . . , 8, it should be apparent that the first time Page A is referenced, it is associated with a reference count R of R=1. The next time Page A is referenced, the reference count is R=8. The system recalls that Page A was last referenced with a reference count of R=1, and therefore determines (at box 710) that the reuse distance R is R=8−1=7.

The reference counter can be implemented, for example, with a 32-bit counter, so that approximately one billion references can be counted before the counter value wraps around, or starts over at zero. It should be apparent that, at the wrap around point, the reference count of an "old" page will be less than the reference count of the current page. The preferred embodiment handles the wrap around situation in a relatively simple manner, by recognizing that the more time has passed since a page was referenced, the less likely the page is still in the cache directory. Therefore, if the reference count of the old page is greater than the reference count of the current page, the system assumes that the reference counter has wrapped around once, and adjusts the current reference counter determination. The size of the reference counter is selected to make the assumption valid for the system in which the invention is implemented. A 32-bit counter has been found to be a reasonable size for most systems.

More particularly, the wrap around adjustment can be implemented such that, upon detecting a wrap around situation, the system subtracts the older reference count value from the maximum count size, and then adds the new (current) reference count value. For example, if the reference counter value wraps around at R=255, and if the first Page A reference in the FIG. 2 example has an associated reference count value of R=254, then the second reference to Page A will occur when the reference counter value is R=5. When the system looks up Page A in the cache directory and finds that the new reference count value is less than the old reference count value, the system assumes that a wrap around has occurred. In response, the system does not get reuse distance by subtracting new from old, rather the system determines the reuse distance by Equation (12) below:

$$R = \text{Max}_{count} - \text{Older}_{count} + \text{Current}_{count} \quad (12)$$

where, in the example, R=256−254+5=7. It should be noted that this is the same value calculated in the first example given for the box 710 processing.

If there was a cache miss, a negative outcome at the box 708, then the reuse distance for the current reference is set to a predetermined value, typically a value larger than anticipated for any reference in the cache, so that it is relatively easy to later determine the number of cache misses. This processing is represented by the flow diagram box numbered 712.

After the cache hit or miss decision has been made, processing moves to an update of the cache directory entry with the new reference number. That is, the top of the cache "stack" will be updated with the new data. This processing is represented by the flow diagram box numbered 714. Next, the newly determined reuse distance is added to the reuse tally to maintain the reuse distribution function calculation. This processing is represented by the flow diagram box numbered 716.

Lastly, the computer system checks for additional references to process. As noted above, the additional references could refer to more data references in a system trace being processed off-line, or the additional references could refer to data references in a sequential real-time stream of data references. In either case, if there are additional references to process, an affirmative outcome at box 718, then processing returns to checking the next (current) reference at box 706. If there are no more references to process, either because the real-time analysis is over or the system trace has been processed, then the negative processing outcome of the box 718 indicates that other system processing continues.

Performing Cache Management

Figure 8:
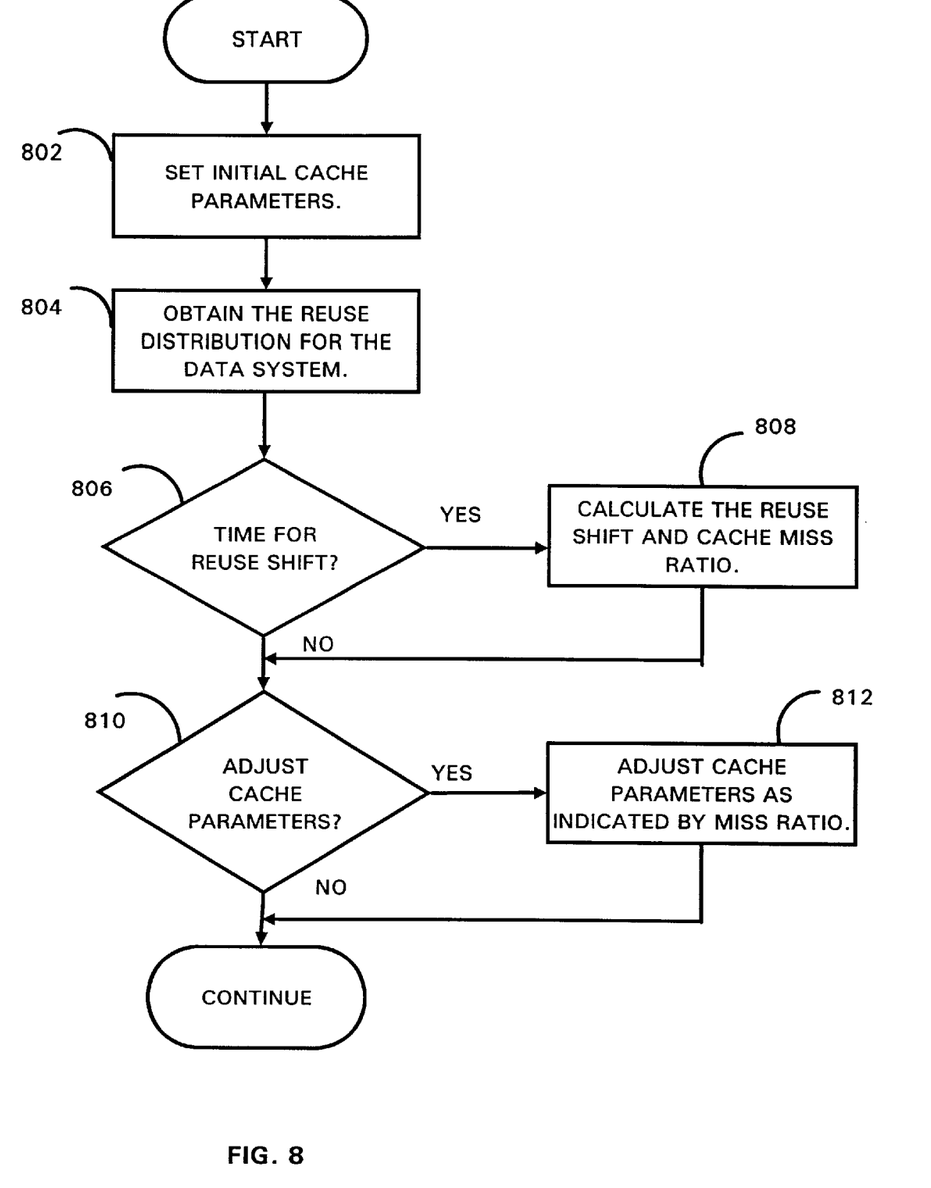
FIG. 8 is a flow diagram that illustrates the processing steps executed by the computer processing system of FIG. 3 to perform the cache management task in accordance with the present invention.

FIG. 8 is a flow diagram that illustrates the processing steps executed by the computer processing system of FIG. 3 to perform the cache management task in accordance with the present invention. As noted above, the cache miss ratio is used to determine cache operating parameters such as cache size and allocation of workload streams to and from databases. In accordance with the invention, off-line processing of trace data to determine cache miss ratio is made more efficient, sufficiently so that real-time processing of system data is possible to determine cache miss ratio during system operation and adjust cache operating parameters accordingly. Such functioning is represented by the FIG. 8 flow diagram.

The first step of system operation, represented by the flow diagram box numbered 802, is an initialization step that involves the setting of initial cache operating parameters. For example, an initial cache size or allocation may be made based on historical data or other default methods of allocation. The next processing step is to obtain the reuse distribution for the data stream. Such cache miss ratio processing, represented by the flow diagram box numbered 804, is performed with each new reference so as to determine the appropriate distribution data.

After the reuse distribution processing has been completed, the reuse shift must be calculated before the cache miss ratio can be determined. Although the technique described above for deriving cache miss ratio from stack reuse statistics is sufficiently efficient that a data stream of references can be received and processed to determine cache miss ratio in real time, it may be desirable to operate the system in something less than real time. FIG. 8 therefore indicates a decision to accumulate the reuse distribution on each reference, represented by the decision box numbered 806. The reuse distribution is periodically interpreted probabilistically, as described above in conjunction with FIG. 5, and the cache miss ratio curve is generated. In this way, dynamic cache operating parameter adjustments may be performed at regular intervals on accumulated data or in response to predetermined data events, such as reference size or other efficiency metrics. Ordinarily, however, the reuse distribution and approximated reuse shift will be continuously calculated in real time as the system operates.

If the time for calculating reuse shift is present, either by a triggering event or by default, then the processing for an affirmative outcome at the decision box 806 involves calculating the reuse shift and determining the cache miss ratio. This processing is represented by the flow diagram box numbered 808. Whether or not the reuse shift is calculated, the system permits dynamic adjustment of cache operating parameters. That is, it might be desirable to adjust cache parameters only if the miss ratio reaches a predetermined level. Moreover, the system operating characteristics might be such that a currently calculated reuse shift and cache miss ratio are not needed for making the cache adjustment decision. Accordingly, if reuse shift is not calculated, a negative outcome at the decision box 806, and after reuse shift and cache miss ratio are calculated, the system makes a decision about adjusting cache parameters at the decision box numbered 810. Thus, the decision may involve checking the cache miss ratio for a triggering level, or it may involve a time of day calculation, or a workload volume decision.

If a cache adjustment should be made, an affirmative outcome at the decision box 810, then the system adjusts the cache operating parameters accordingly. The adjustment processing is represented by the flow diagram box numbered 812. As noted above, this may involve allocation of data streams involving particular databases to different cache partitions or may involve adjustment of storage resources allocated to cache size. Such processing 812 can occur in real time in response to the received reference stream. If no adjustment is needed, a negative outcome at box 810, then typical system operation is continued.

RESULTS

Figure 9:
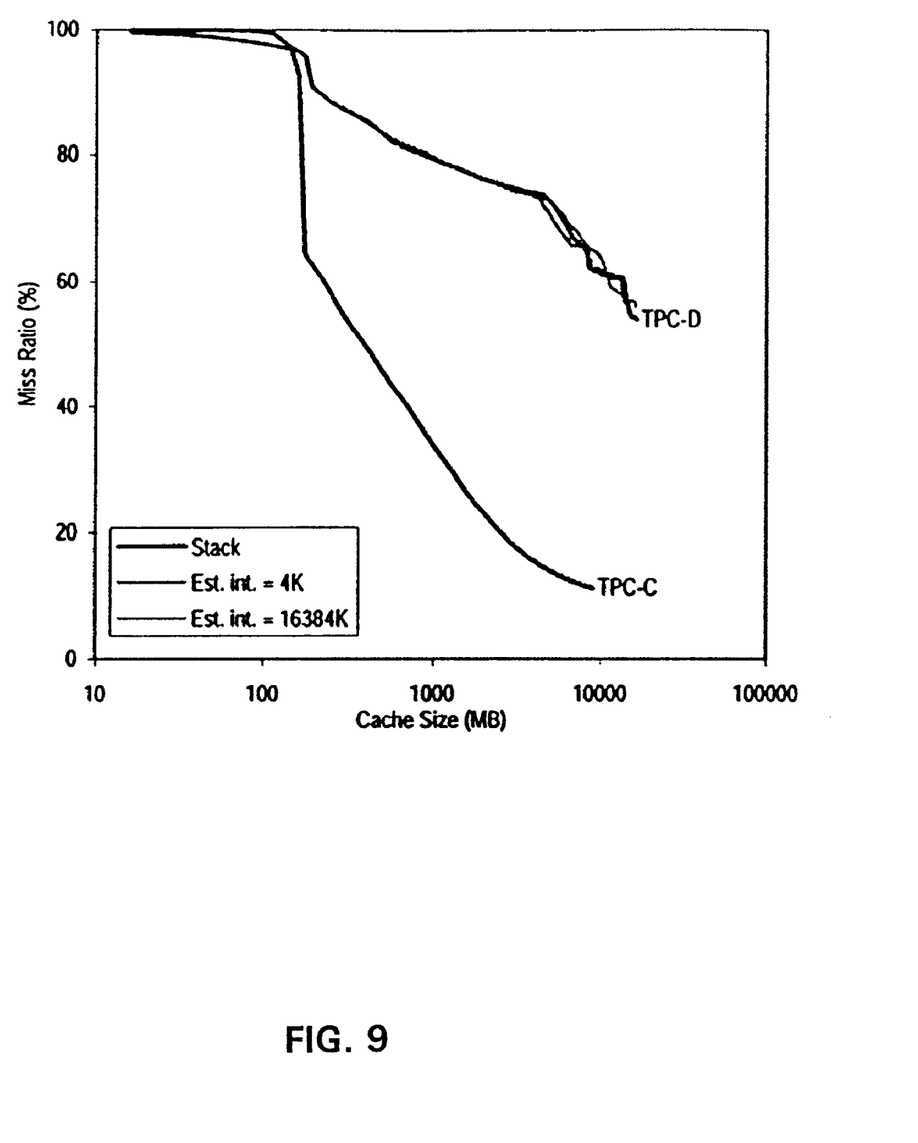
FIG. 9 is a graph showing results of a trace-driven simulation of a system constructed in accordance with the present invention.

Simulation has been performed using traces taken from workloads similar to the industry-standard database benchmarks referred to as TPC-C and TPC-D. The results of the simulation, using the system constructed in accordance with the present invention, is shown in FIG. 9. A fixed database buffer pool size of 128 MB was assumed. The cache was subjected to a "warm-up" period of operation. FIG. 9 shows the results for estimate intervals of 4K and 16M references. That is, the size of the data blocks being referenced into the cache are blocks of either 4K or 16M. Data points are plotted only where the cache is filled after the predetermined warm-up period. It can be seen that the technique in accordance with the present invention very closely approximates the actual LRU stack distribution, and in fact, for the workload similar to the TPC-C benchmark the curves are virtually indistinguishable.

The discrepancies toward the right end of the TPC-D plot have been found to be the result of insufficient references to permit a good approximation at the larger cache sizes. It should be noted that the technique does not appear to be sensitive to the estimate interval, or granularity. The good results obtained for the TPC-C and TPC-D data have been duplicated with test data from a variety of peak production database workloads from various large corporations. In general, it has been found that the number of observations needed before a reuse shift is performed should be at least equal to the expected reuse distance. In addition, the trace workload is run for a time to fill the cache before the simulation begins, to provide what is known as a warm start.

The present invention has been described above in terms of a presently preferred embodiment so that an understanding of the present invention can be conveyed. There are, however, many configurations for cache management systems not specifically described herein but with which the present invention is applicable. The present invention should therefore not be seen as limited to the particular embodiments described herein, but rather, it should be understood that the present invention has wide applicability with respect to cache management systems generally. All modifications, variations, or equivalent arrangements and implementations that are within the scope of the attached claims should therefore be considered within the scope of the invention.

We claim:

1. A method of operating a cache storage system that temporarily stores data pages in a computer system, the method comprising the steps of:

generating a reuse distribution for a stream of data references into the cache storage system;

determining the number of repeated page references and calculating a reuse shift amount;

adjusting the reuse distribution by the calculated reuse shift amount; and producing an adjusted cache stack distance that specifies a cache miss ratio for the cache storage system.

2. A method as defined in claim 1, further including the step of adjusting one or more operating parameters of the cache storage system in response to the produced cache miss ratio.

3. A method as defined in claim 1, wherein the cache miss ratio is produced during normal operation of the cache storage system.

4. A method as defined in claim 1, wherein the cache miss ratio is produced in response to a real-time continuing stream of data references in the computer system.

5. A method as defined in claim 1, wherein the step of generating a reuse distribution comprises the steps of:

determining a reuse distance for each new cache data reference in the stream of data references;

updating a cache directory of reference data pages with the determined reuse distance; and adding each determined reuse distance in the stream of data references to a reuse tally, thereby maintaining a tally of reuse distance.

6. A method as defined in claim 5, wherein the step of determining a reuse distance comprises:

associating a unique reference count number for each new data page reference in the data stream;

determining a previous reference count number for the data page if the page was previously referenced; and setting the reuse distance to the reference count for a current data page reference in the cache minus the previous reference count for the same data page.

7. A method as defined in claim 6, wherein the step of setting the reuse distance comprises determining if the reference count number for a current data page is less than the previous reference count number for the same data page and, in response, determining the reuse distance by subtracting the previous reference count number from a maximum reference count value and adding the current reference count number.

8. A method as defined in claim 1, wherein the cache storage system is operated as a Least Recently Used (LRU) cache.

9. A cache storage system that temporarily stores data pages in a computer system, the system comprising:

a cache store that receives data pages; and a cache controller that generates a reuse distribution for a stream of data page references into the cache storage system, determines the number of repeated page references and calculates a reuse shift amount, adjusts the reuse distribution by the calculated reuse shift amount, and produces an adjusted cache stack distance that specifies a cache miss ratio for the cache storage system.

10. A system as defined in claim 9, wherein the cache controller further adjusts one or more operating parameters of the cache storage system in response to the produced cache miss ratio.

11. A system as defined in claim 9, wherein the cache controller produces the cache miss ratio during normal operation of the cache storage system.

12. A system as defined in claim 9, wherein the cache controller produces the cache miss ratio in response to a real-time continuing stream of data references in the computer system.

13. A system as defined in claim 9, wherein the cache controller generates a reuse distribution by:
determining a reuse distance for each new cache data reference in the stream of data references;
updating a cache directory of reference data pages with the determined reuse distance; and
adding each determined reuse distance in the stream of data references to a reuse tally, thereby maintaining a tally of reuse distance.

14. A system as defined in claim 13, wherein the cache controller determines a reuse distance by:
associating a unique reference count number for each new data page reference in the data stream;
determining a previous reference count number for the data page if the page was previously referenced; and
setting the reuse distance to the reference count for a current data page reference in the cache minus the previous reference count for the same data page.

15. A system as defined in claim 14, wherein the cache controller sets the reuse distance by determining if the reference count number for a current data page is less than the previous reference count number for the same data page and, in response, determining the reuse distance by subtracting the previous reference count number from a maximum reference count value and adding the current reference count number.

16. A cache controller for a cache storage system that temporarily stores data pages in a computer system, the cache controller comprising:
a central processor unit;
a network interface through which the central processor unit communicates with one or more computers; and
program memory that contains program steps that are executed by the central processor unit to generate a reuse distribution for a stream of data references into the cache storage system, determine the number of repeated page references and calculating a reuse shift amount, adjust the reuse distribution by the calculated reuse shift amount, and produce an adjusted cache stack distance that specifies a cache miss ratio for the cache storage system.

17. A cache controller as defined in claim 16, wherein the program steps further cause the central processor unit to adjust one or more operating parameters of the cache storage system in response to the produced cache miss ratio.

18. A cache controller as defined in claim 16, wherein the central processor unit produces the cache miss ratio during normal operation of the cache storage system.

19. A cache controller as defined in claim 16, wherein the central processor unit produces the cache miss ratio in response to a real-time continuing stream of data references in the computer system.

20. A cache controller as defined in claim 16, wherein the central processor unit generates the reuse distribution by:
determining a reuse distance for each new cache data reference in the stream of data references;
updating a cache directory of reference data pages with the determined reuse distance; and
adding each determined reuse distance in the stream of data references to a reuse tally, thereby maintaining a tally of reuse distance.

21. A cache controller as defined in claim 20, wherein the central processor unit determines a reuse distance by:
assosciating a unique reference count number for each new data page reference in the data stream;
determining a previous reference count number for the data page if the page was previously referenced; and
setting the reuse distance to the reference count for a current data page reference in the cache minus the previous reference count for the same data page.

22. A cache controller as defined in claim 21, wherein the central processor unit sets the reuse distance by determining if the reference count number for a current data page is less than the previous reference count number for the same data page and, in response, determining the reuse distance by subtracting the previous reference count number from a maximum reference count value and adding the current reference count number.

23. A cache controller as defined in claim 16, wherein the cache storage system is operated as a Least Recently Used (LRU) cache.

24. A program product for use in a computer system that executes program steps recorded in a computer-readable media to perform a method for operating a cache storage system that temporarily stores data pages in a computer system, the program product comprising:
a recordable media;
a program of computer-readable instructions executable by the computer system to perform steps comprising:
generating a reuse distribution for a stream of data references into the cache storage system;
determining the number of repeated page references and calculating a reuse shift amount;
adjusting the reuse distribution by the calculated reuse shift amount; and
producing an adjusted cache stack distance that specifies a cache miss ratio for the cache storage system.

25. A program product as defined in claim 24, wherein the program steps further include the step of adjusting one or more operating parameters of the cache storage system in response to the produced cache miss ratio.

26. A program product as defined in claim 24, wherein the cache miss ratio is produced during normal operation of the cache storage system.

27. A program product as defined in claim 24, wherein the cache miss ratio is produced in response to a real-time continuing stream of data references in the computer system.

28. A program product as defined in claim 24, wherein the program step of generating a reuse distribution comprises the steps of:
determining a reuse distance for each new cache data reference in the stream of data references;
updating a cache directory of reference data pages with the determined reuse distance; and
adding each determined reuse distance in the stream of data references to a reuse tally, thereby maintaining a tally of reuse distance.

29. A program product as defined in claim 28, wherein the program step of determining a reuse distance comprises:
associating a unique reference count number for each new data page reference in the data stream;

determining a previous reference count number for the data page if the page was previously referenced; and setting the reuse distance to the reference count for a current data page reference in the cache minus the previous reference count for the same data page.

30. A program product as defined in claim 29, wherein the program step of setting the reuse distance comprises determining if the reference count number for a current data page is less than the previous reference count number for the same data page and, in response, determining the reuse distance by subtracting the previous reference count number from a maximum reference count value and adding the current reference count number.

31. A program product as defined in claim 24, wherein the cache storage system is operated as a Least Recently Used (LRU) cache.

* * * * *